US011995836B2

(12) United States Patent
Jafek et al.

(10) Patent No.: US 11,995,836 B2
(45) Date of Patent: May 28, 2024

(54) SYSTEM AND METHOD FOR PERFORMING SKY-SEGMENTATION

(71) Applicant: Aurora Flight Sciences Corporation, a subsidiary of The Boeing Company, Manassas, VA (US)

(72) Inventors: Benjamin Jafek, Somerville, MA (US); Samvruta Tumuluru, San Francisco, CA (US)

(73) Assignee: AURORA FLIGHT SCIENCES CORPORATION, A SUBSIDIARY OF THE BOEING COMPANY, Manassas, VA (US)

( * ) Notice: Subject to any disclaimer, the term of this patent is extended or adjusted under 35 U.S.C. 154(b) by 502 days.

(21) Appl. No.: 17/328,835

(22) Filed: May 24, 2021

(65) Prior Publication Data
US 2022/0012889 A1    Jan. 13, 2022

Related U.S. Application Data (60) Provisional application No. 63/048,817, filed on Jul. 7, 2020.

(51) Int. Cl.
*G06T 7/11*       (2017.01)
*G05D 1/00*     (2006.01)
(Continued)

(52) U.S. Cl.
CPC .............. *G06T 7/11* (2017.01); *G05D 1/106* (2019.05); *G06T 7/13* (2017.01); *G06T 7/136* (2017.01);
(Continued)

(58) Field of Classification Search
CPC ........... G06V 10/764; G06T 1/00; G06T 7/00; G06T 7/10; G06T 7/11; G06T 7/136;
(Continued)

(56) References Cited

U.S. PATENT DOCUMENTS

| 10,132,669 B2* | 11/2018 | Israelsen .................. G06T 7/11 |
| 2011/0018990 A1 | 1/2011 | Komoto et al. |
| 2019/0392268 A1* | 12/2019 | Tariq ..................... G06V 20/56 |

FOREIGN PATENT DOCUMENTS

| CN | 110516629 A | * | 11/2019 | |
| JP | 2020066421 A | * | 4/2020 | ............. B64C 13/16 |

OTHER PUBLICATIONS deCroon et al., "Sky Segmentation Approach to Obstacle Avoidance," IEEE Aerospace Conference. 2011, 31 pages.
(Continued)

*Primary Examiner* — Dung Hong
(74) *Attorney, Agent, or Firm* — MH2 Technology Law Group LLP (57) ABSTRACT

A method includes identifying a first image. The method also includes determining a distribution based at least partially upon an intensity of each pixel in the first image. The method also includes determining that the distribution is bimodal. The method also includes dividing the first image to produce a second image in response to determining that the distribution is bimodal. The second image includes a plurality of first pixels and a plurality of second pixels. The method also includes determining that a horizon is defined between the plurality of first pixels and the plurality of second pixels.

20 Claims, 8 Drawing Sheets

(51) Int. Cl.
*G06T 7/13* (2017.01)
*G06T 7/136* (2017.01)
*G06T 7/90* (2017.01)

(52) U.S. Cl.
CPC ...... *G06T 7/90* (2017.01); *G06T 2207/10032* (2013.01); *G06T 2207/30241* (2013.01); *G06T 2207/30242* (2013.01)

(58) Field of Classification Search
CPC ... G06T 7/13; G06T 7/90; G06T 2207/10032; G06T 2207/30241; G06T 2207/30242; G05D 1/106
See application file for complete search history.

(56) References Cited

OTHER PUBLICATIONS

Dusha et al., "Attitude Estimation for a Fixed-Wing Aircraft Using Horizon Detection and Optical Flow," Digital Image Computing Techniques and Application, IEEE Computer Society, 2007, pp. 485-492.

Ettinger et al., "Towards Flight Autonomy: Vision-Based Horizon Detection for Micro Air Vehicles," ResearchGate.net, May 2002, 9 pages.

He et al., "Deep Residual Learning for Image Recognition, " Microsoft Research, arXiv: 1512.03385v1[cs.CV] Dec. 2015, pp. 1-12.

Hoiem, D. et al., "Geometric Context from a Single Image," Tenth IEEE International Conference on Computer Vision (ICCV'05) vol. 1, Beijing, China, 2005, pp. 654-661 vol. 1, doi: 10.1109/ICCV. 2005.107.

Long et al., "Fully Convolutional Networks for Semantic Segmentation," 2015, pp. 3431-3440.

McGee et al., "Obstacle Detection for Small Autonomous Aircraft Using Sky Segmentation," 2005, 4679-4684, 10.1109/ROBOT.2005. 1570842.

More J.J., "The Levenberg-Marquardt algorithm: Implementation and theory," In: Watson G.A. (eds) Numerical Analysis. Lecture Notes in Mathematics, 1978, vol. 630. Springer, Berlin, Heidelberg. https://doi.org/10.1007/BFb006770016 pages.

Otsu, "A Threshold Selection Method from Gray-Level Histograms," IEEE Transactions on System Man, and Cybernetics, vol. SMC-9, No. 1, Jan. 1979, pp. 62-66.

Tighe et al., "SuperParsing: Scalable Nonparametric Image Parsing with Superpixels," International Journal of Computer Vision, 2010, 101(2):352-365.

Wang et al., "Integration of GPS/INS/Vision Sensors to Navigate Unmanned Aerial Vehicles," 2008, 6 pages.

Wang et al., "A Sea-Sky Line Detection Method for Unmanned Surface Vehicles Based on Gradient Saliency," MDPI, Sensors, 2016, 16, 543, 18 pages.

Fefilatyev, S. et al., "Horizon Detection Using Machine Learning Techniques," 2006 5th International Conference on Machine Learning and Applications (ICMLA'06), 2006, vol. 1, pp. 17-21.

Ahmad et al., "Comparison of Semantic Segmentation Approaches for Horizon/Sky Line Detection," IEEE (2017) 4436-4443.

Carrio et al., "Obstacle Detection System for Small UAVs Using ADS-B and Thermal Imaging," J Intell Robot Syst (2017) 88:583-595.

Carrio et al., "A Real-Time Supervised Learning Approach for Sky Segmentation Onboard Unmanned Aerial Vehicles," IEEE, 2016 International Conference on Unmanned Aircraft Systems (ICUAS) Jun. 7-10, 2016, pp. 8-14.

Horiuchi, "A Low-Power Visual-Horizon Estimation Chip," IEEE Transactions on Circuits and Systems, I:Regular Papers, vol. 56, No. 8, Aug. 2009, 1566-1575.

Jiao et al., "L0 Gradient Smoothing and Bimodal Histogram Analysis: A Robust Method for Sea-Sky-Line Detection," MMAsia '19, Dec. 15-18, 2019, Beijing, China, 6 pages.

Neto et al., "Robust Horizon Finding Algorithm for Real-Time Automomous Navigation Based on Monocular Vision," IEEE, 2011 14th International IEEE Conference on Intelligent Transportation Systems, Washington, DC, USA, Oct. 5-7, 2011, 6 pages.

Porzi et al., "A Deeply-Supervised Deconvolutional Network for Horizon Line Detection," MM '16, Oct. 15-19, 2016, Amsterdam, Netherlands, pp. 137-141.

Extended European Search Report issued Dec. 6, 2021 in corresponding European Application No. 21182207.7 (13 pages).

* cited by examiner

SYSTEM AND METHOD FOR PERFORMING SKY-SEGMENTATION

CROSS-REFERENCE TO RELATED APPLICATIONS

This patent application claims priority to U.S. Provisional Patent Application No. 63/048,817, filed on Jul. 7, 2020, the entirety of which is incorporated by reference herein.

FIELD OF THE DISCLOSURE

The present disclosure is directed to sky segmentation. More particularly, the present disclosure is directed to performing sky segmentation on an image or video frame to help a moving vehicle determine where the sky and/or the horizon is relative to the vehicle for navigation purposes.

BACKGROUND

Many kinds of autonomous vehicles (e.g., cars, aircraft, watercraft) need to determine which direction is up and which is down. Some vehicles make this determination using global positioning system (GPS) data and/or inertial navigation system (INS) data to determine where the sky and/or the horizon relative to the vehicle. However, visual imagery can also be used to determine where the sky and/or the horizon is relative to the vehicle. For example, a sky segmentation process may be applied to an image or video frame to determine where the sky and/or the horizon is relative to the vehicle. Sky segmentation uses a machine-learning model to associate pixels in an image or video frame with the sky.

Sky segmentation methods fall generally into one of three categories. One category uses color or intensity information to divide the image into two regions (e.g., ground and sky). Another category uses gradient-based methods to detect the horizon as the longest horizontal edge in the image. Another category uses deep learning semantic segmentation to segment sky regions.

SUMMARY

A method for segmenting an image into a sky region and a ground region is disclosed. The method includes receiving or identifying a first image. The method also includes determining a distribution based at least partially upon an intensity of each pixel in the first image. The method also includes determining that the distribution is bimodal. The method also includes dividing the first image to produce a second image in response to determining that the distribution is bimodal. The second image includes a plurality of first pixels and a plurality of second pixels. The method also includes determining that a horizon is defined between the plurality of first pixels and the plurality of second pixels.

A computing system is also disclosed. The computing system includes one or more processors and a memory system. The memory system includes one or more non-transitory computer-readable media storing instructions that, when executed by at least one of the one or more processors, cause the computing system to perform operations. The operations include identifying a first image. The operations also include identifying a number of edges in the first image. The operations also include determining a distribution based at least partially upon an intensity of each pixel in the first image when the number of edges is greater than a predetermined threshold. The operations also include determining that the distribution approximates a bimodal mixture of Gaussian distributions. The operations also include in response to determining that the distribution approximates the bimodal mixture of Gaussian distributions, dividing the first image to produce a second image. The second image includes a plurality of first pixels corresponding to a ground region and a plurality of second pixels corresponding to a sky region. The operations also include determining that a horizon is defined between the first pixels and the second pixels.

In another example, the operations include identifying a first image. The image is captured by a camera on an aircraft in flight. The operations also include identifying a number of edges in the first image. The operations also include determining a histogram based at least partially upon an intensity of each pixel in the first image when the number of edges is greater than a predetermined threshold. The operations also include determining that the histogram more closely approximates a bimodal mixture of Gaussian distributions than a unimodal Gaussian distribution. Determining that the histogram more closely approximates the bimodal mixture of Gaussian distributions includes determining a first error between the histogram and the bimodal mixture of Gaussian distributions that corresponds to the histogram. The determination that the histogram more closely approximates the bimodal mixture of Gaussian distributions is based at least partially upon the first error. In response to determining that the histogram more closely approximates the bimodal mixture of Gaussian distributions, the operations also include dividing the first image to produce a second image. The second image includes a plurality of first pixels corresponding to a ground region and a plurality of second pixels corresponding to a sky region. The first pixels have a first color, and the second pixels have a second, different color. The operations also include filtering the second image to produce a third image. The operations also include determining that a horizon is defined between the first pixels and the second pixels in the third image. The operations also include combining the first image and at least a portion of the third image to produce a fourth image. The fourth image also includes the horizon.

BRIEF DESCRIPTION OF THE DRAWINGS

The accompanying drawings, which are incorporated in and constitute a part of this specification, illustrate aspects of the present teachings and together with the description, serve to explain the principles of the present teachings.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The system and method disclosed herein may be used to visually detect and localize sky regions within an image. This solution may be employed in an air-to-air visual detection system for detect-and-avoid efforts. If both sky and ground are present in an image, the most different regions may be the sky region and the ground region. Such image may be taken from aircraft in air. This has proven to hold in most situations because the aircraft is high above the ground, and the ground generally loses most of the fine detail which would contribute to higher intraclass variance. If only sky is present in the image, few strong edges will be present. Sometimes certain types of clouds can contribute to strong edges, but in general, the sky is free of strong edges. If only ground is present in the image, an intensity representation (e.g., a histogram) may be generally unimodal. Thus, the problem may include determining the image representation, determining if it is unimodal or multimodal, and then if it is multimodal, determining an optimal intensity threshold for dividing the image into a first (e.g., dark) region and a second (e.g., light) region.

The system and method disclosed herein provide increased speed and accuracy over conventional systems and methods. For example, one method, deep semantic segmentation, does not run in real-time. Thus, there is a large time investment required to create the datasets needed for ground truth, as well as actually training the algorithm. In contrast, the system and method disclosed herein do not require these time investments. In addition, the system and method disclosed herein result in an intuitive definition of multimodality of a discrete function.

The method may include using a Canny edge detector to determine how many strong edges are present in the image. If few edges are found, the image is determined to be all sky and the function returns. A histogram of the grayscale image is then determined. The method may then include determining if the histogram is unimodal or multimodal (e.g., bimodal). Because the histogram may represent a discrete, discontinuous function, the usual definition of a mode as a local maximum may not apply. The method may then include using the Levenberg-Marquadt algorithm to approximate the histogram with both unimodal and bimodal Gaussian distributions. The method may then use the error between the actual histogram values and the distributions to classify the histogram as either bimodal or unimodal. If the histogram is determined to be bimodal, then Otsu's thresholding method may be used to optimally divide the image into sky and ground regions, and this binary output is returned. Otherwise, the image is determined to be all ground and the function returns. If the function was determined to be bimodal, then holes in the sky region and ground region are removed through morphology.

Using Otsu thresholding to segment images containing both sky and ground has not been previously used in situations where the image contains only sky or only ground. In these situations, Otsu's method will still split the image into dark and light regions, but these regions will not correspond to sky and ground. In case, the image histograms are discrete and not smooth, the traditional definition of a mode as a local maximum may not capture the overall trend of the data. The method of approximating the distribution with both a unimodal and bimodal Gaussian function is fast and still captures the trend of the data. The method also sets bounds on the feasible magnitudes of the Gaussian functions. Otherwise, the bimodal function may just set one of the modal regions to have a magnitude of 0, and effectively become a unimodal function. The feasible region has been optimized to best capture the trends of the data.

Figure 1:
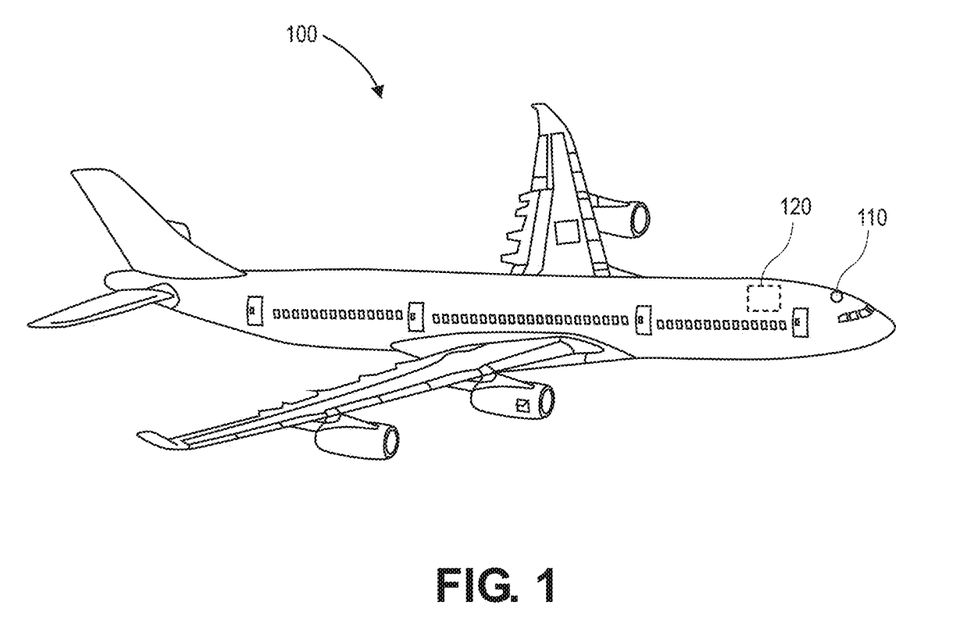
FIG. 1 illustrates a schematic view of an aircraft in flight, according to an example.

FIG. 1 illustrates a schematic view of an aircraft 100 in flight, according to an example. The aircraft 100 may be or include an airplane, a helicopter, an unmanned aerial vehicle (e.g., a drone), a spacecraft, or the like. The aircraft 100 may include a camera 110. The camera 110 may be coupled the aircraft 100 and/or positioned within the aircraft 100. The camera 110 may be configured to capture one or more images. The camera 110 may also or instead be configured to capture a video. In one example, the camera 110 may be configured to capture continual stream of images over time (i.e. a video), and the images may be still frames taken from the video.

The images and/or video may be transmitted to a computing system 120 on the aircraft 100. In another example, the computing system 120 may be located on the ground (e.g., in a control station) in communication with an on-board computing system. The computing system 120 may include one or more processors and a memory system. The memory system may include one or more non-transitory computer-readable media storing instructions that, when executed by at least one of the one or more processors, cause the computing system to perform operations. An example of the operations is provided in FIG. 2.

Figure 2:
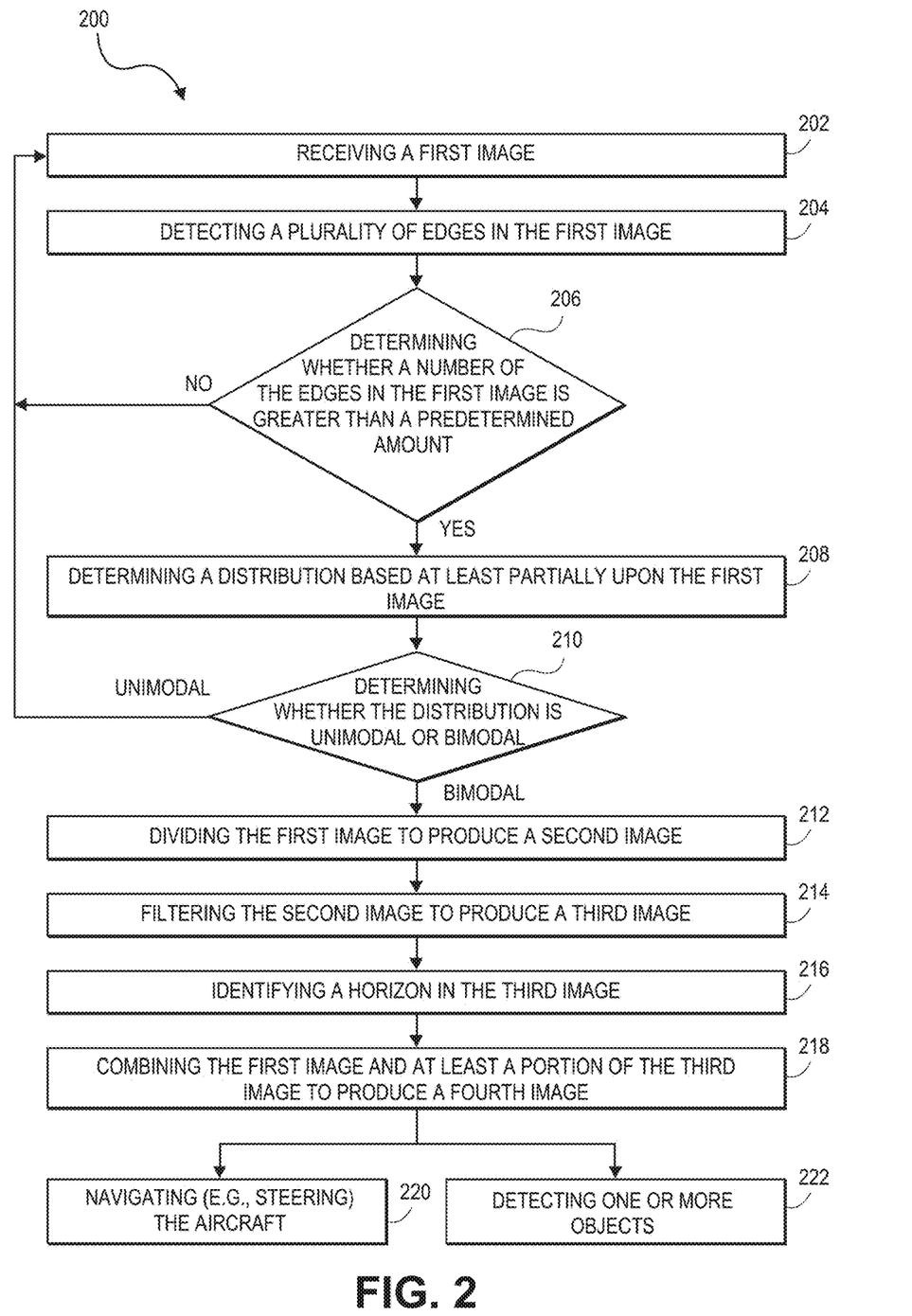
FIG. 2 illustrates a flowchart of a method for segmenting an image into a sky region and a ground region, according to an example.

FIG. 2 illustrates a flowchart of a method 200 for segmenting an image into a sky region and a ground region, according to an example. An illustrative order of the method 200 is described below. One or more steps of the method 200 may be performed in a different order, repeated, or omitted. As indicated below, one or more steps of the method 200 may be performed by the computing system 120.

Figure 3:
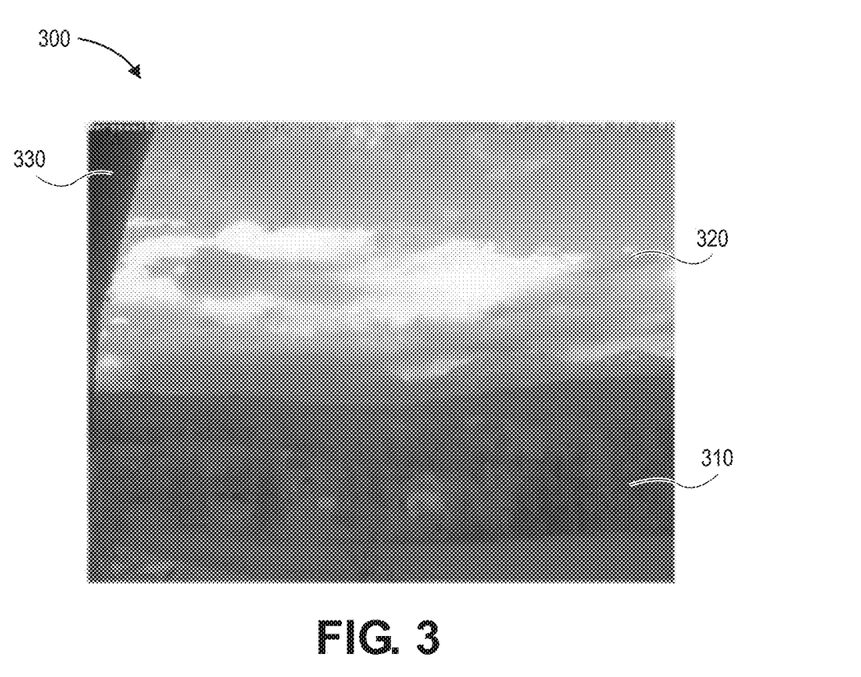
FIG. 3 illustrates a first image captured by a camera on the aircraft in flight, according to an example.

The method 200 may include receiving or identifying a first image, as at 202. An example of the first image 300 is shown in FIG. 3. The first image 300 may be captured by the camera 110 and transmitted to and received/identified by the computing system 120. The camera 110 may be in an upright position and pointed forward such that the first image 300 is in front of the aircraft 100. Thus, the first image 300 may include at least a portion of the flight path of the aircraft 100. The first image 300 may include a ground region 310, a sky region 320, or both. In this particular example, the first image 300 may also include an occlusion (e.g., from nearby objects on the ground) 330. The first image 300 may be in color, and it may be converted to grayscale and/or binary (e.g., black and white).

Figure 4:
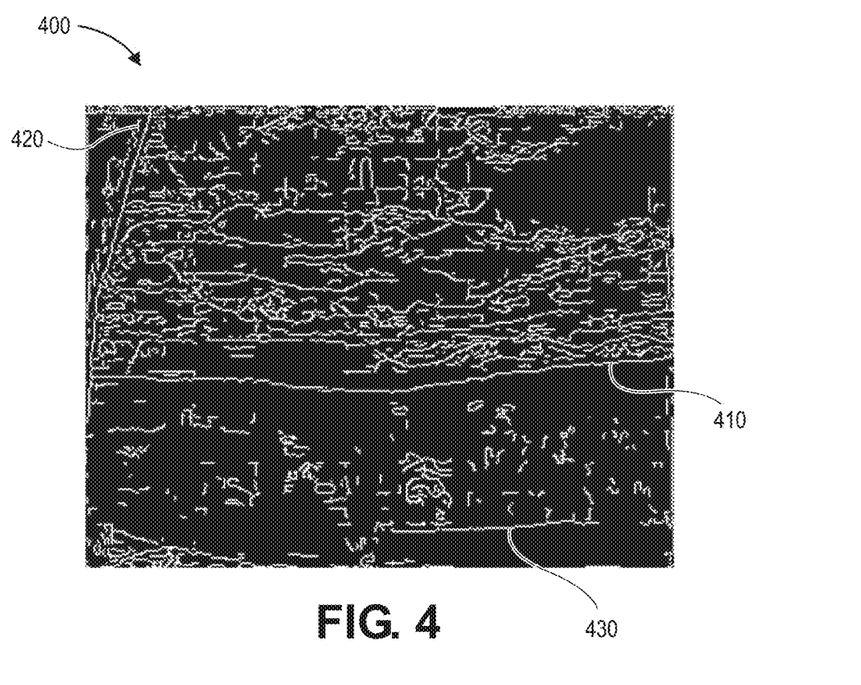
FIG. 4 illustrates the first image with a number of edges identified, according to an example.

The method 200 may also include detecting a plurality of edges (three are identified: 410, 420, 430) in the first image 300 to produce an edge-detected first image 400, as at 204. FIG. 4 shows the edge-detected first image 400 including edges 410, 420, 430. As used herein, an "edge" refers to a point or line (e.g., one or more pixels) in an image where the brightness changes sharply (e.g., by more than a predetermined threshold). Although the edge-detected first image 400 includes more than three edges, for the sake of simplicity, only three are identified in FIG. 4. This step may be performed by the computing system 120. More particularly, the computing system 120 may use canny edge detection (e.g., with low hysteresis parameters) or Laplacian edge detection to detect the edges 410, 420, 430. The detection may be based at least partially upon a sensitivity threshold of the intensity of the pixels in the image 300 and/or the image 400. For example, the sensitivity threshold may be increased (e.g., by a user) to detect more edges in the image 300 and/or the image 400, or the sensitivity threshold may be decreased to detect fewer edges in the image 300 and/or the image 400. The image 400 may be binary, and pixels representing an edge 410, 420, 430 may have a value of zero (e.g., white), and pixels that do not represent an edge 410, 420, 430 may have a value of one (e.g., black), or vice versa.

The method 200 may also include determining whether a number of the edges 410, 420, 430 in the image 400 is greater than a predetermined amount/threshold, as at 206. This step may be performed by the computing system 120. When the number of edges 410, 420, 430 is less than the predetermined amount/threshold, it may be determined that the image 300 and/or the image 400 includes no ground region 310 and all sky region 320. The method 200 may then loop back around to step 202. When the number of edges 410, 420, 430 is greater than the predetermined amount/threshold, it may be determined that the image 300 and/or the image 400 includes the ground region 310. For example, it may be determined that the image 300 and/or the image 400 includes a combination of the ground region 310 and the sky region 320. The method 200 may then proceed as described below.

Figure 5:
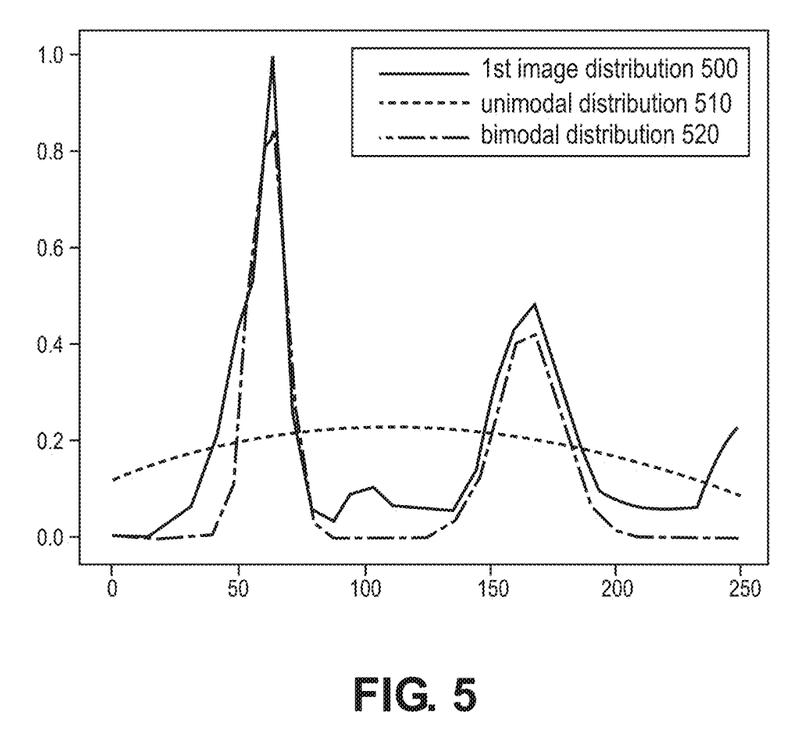
FIG. 5 illustrates a distribution (e.g., a histogram) based at least partially upon the first image, according to an example.

The method 200 may also include determining a distribution 500 based at least partially upon the image 300 and/or the image 400, as at 208. This step may be performed by the computing system 120. More particularly, in response to the number of edges 410, 420, 430 being greater than the predetermined amount/threshold, the computing system 120 may determine the distribution 500 based at least partially upon an intensity of one or more (e.g., each) pixel in the image 300 and/or the image 400. This is shown in FIG. 5. The distribution 500 may be or include a histogram. The first image 300 may be stored in an 8-bit format, meaning that there are 256 intensity possibilities for each pixel. Thus, the X-axis of the distribution 500 may go from 0-255. The Y-axis may go from 0-1.

The method 200 may also include determining whether the distribution 500 is unimodal or bimodal, as at 210. This step may be performed by the computing system 120. This step may include comparing the distribution 500 to a unimodal Gaussian distribution 510 that corresponds to the distribution 500. This is also shown in FIG. 5. Then, a first error may be determined between the distribution 500 and the unimodal Gaussian distribution 510. In this particular example, the first error is 4.8. This step may also include comparing the distribution 500 to a bimodal mixture of Gaussian distributions 520 that corresponds to the distribution 500. This is also shown in FIG. 5. Then, a second error may be determined between the distribution 500 and the bimodal mixture of Gaussian distributions 520. In this example, the second error is 2.3.

The determination whether the distribution 500 is unimodal or bimodal may then be based at least partially upon the first error and/or the second error. More particularly, it may be determined that the distribution 500 is unimodal when the first error is less than the second error, and it may be determined that the distribution 500 is bimodal when the second error is less than the first error. In this particular example, the second error is less because the bimodal mixture of Gaussian distributions 520 more closely approximates the distribution 500. Thus, the distribution 500 is determined to be bimodal, meaning that the first image 300 includes two (e.g., different) distributions.

When the distribution 500 is unimodal, it may be determined that the image 300 and/or the image 400 includes a single distribution (e.g., all ground region 310 and no sky region 320). The method 200 may then loop back to step 202. When the distribution 500 is bimodal, it may be determined that the image 300 and/or the image 400 includes the sky region 320. For example, it may be determined that the image 300 and/or the image 400 includes two distributions (e.g., a combination of the ground region 310 and the sky region 320). The method 200 may then proceed as described below.

Figure 6:
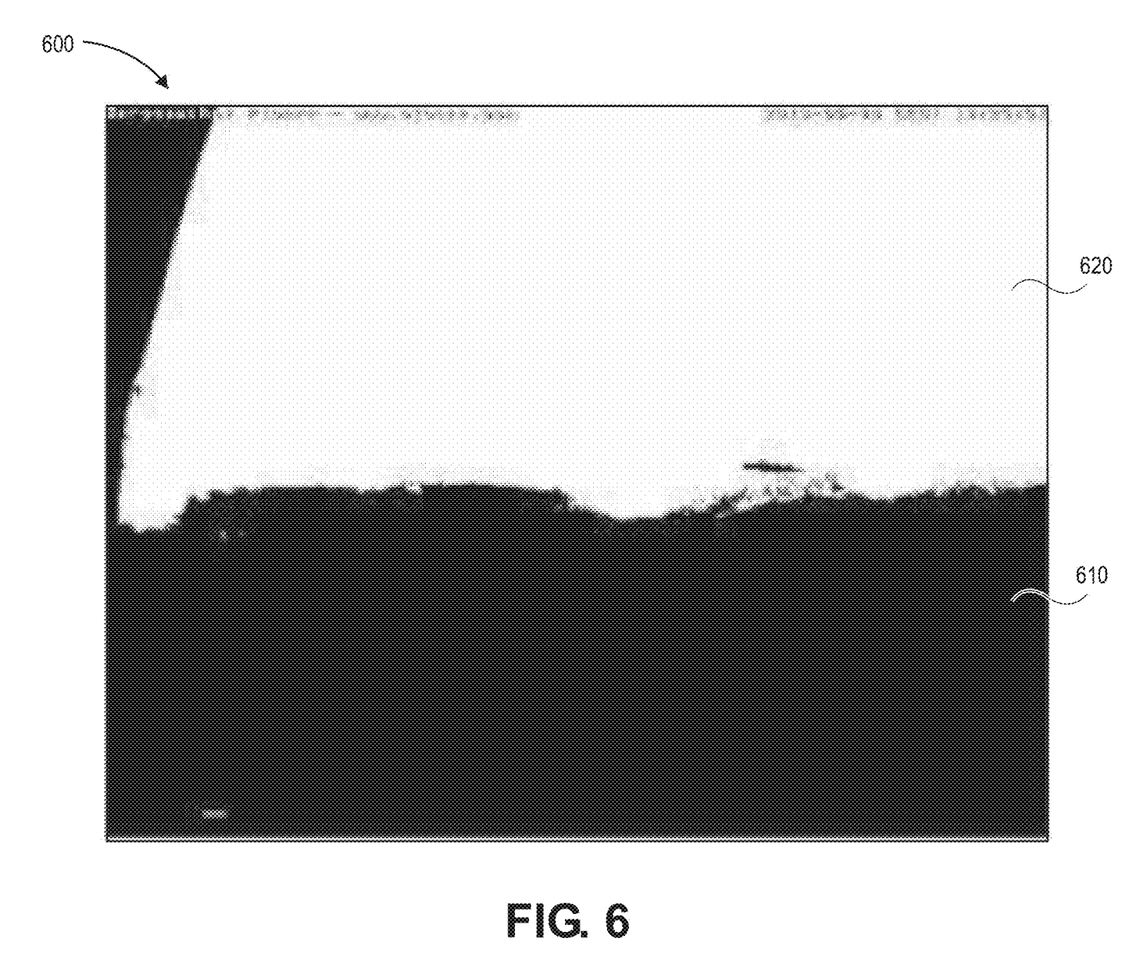
FIG. 6 illustrates a second (e.g., divided) image based at least partially upon the first image, according to an example.

In response to determining that the distribution 500 is bimodal, the method 200 may also include dividing the image 300 and/or the image 400 to produce a second (e.g., divided) image 600, as at 212. This step may be performed by the computing system 120. More particularly, the computing system 120 may divide the image 300 and/or the image 400 (e.g., into the two distributions) using adaptive binary intensity thresholding or Otsu's binarization method. The second image 600 is shown in FIG. 6. The second image 600 may include a plurality of first (e.g., black) pixels 610 that correspond to the ground region 310 and a plurality of second (e.g., white) pixels 620 that correspond to the sky region 320.

Figure 7:
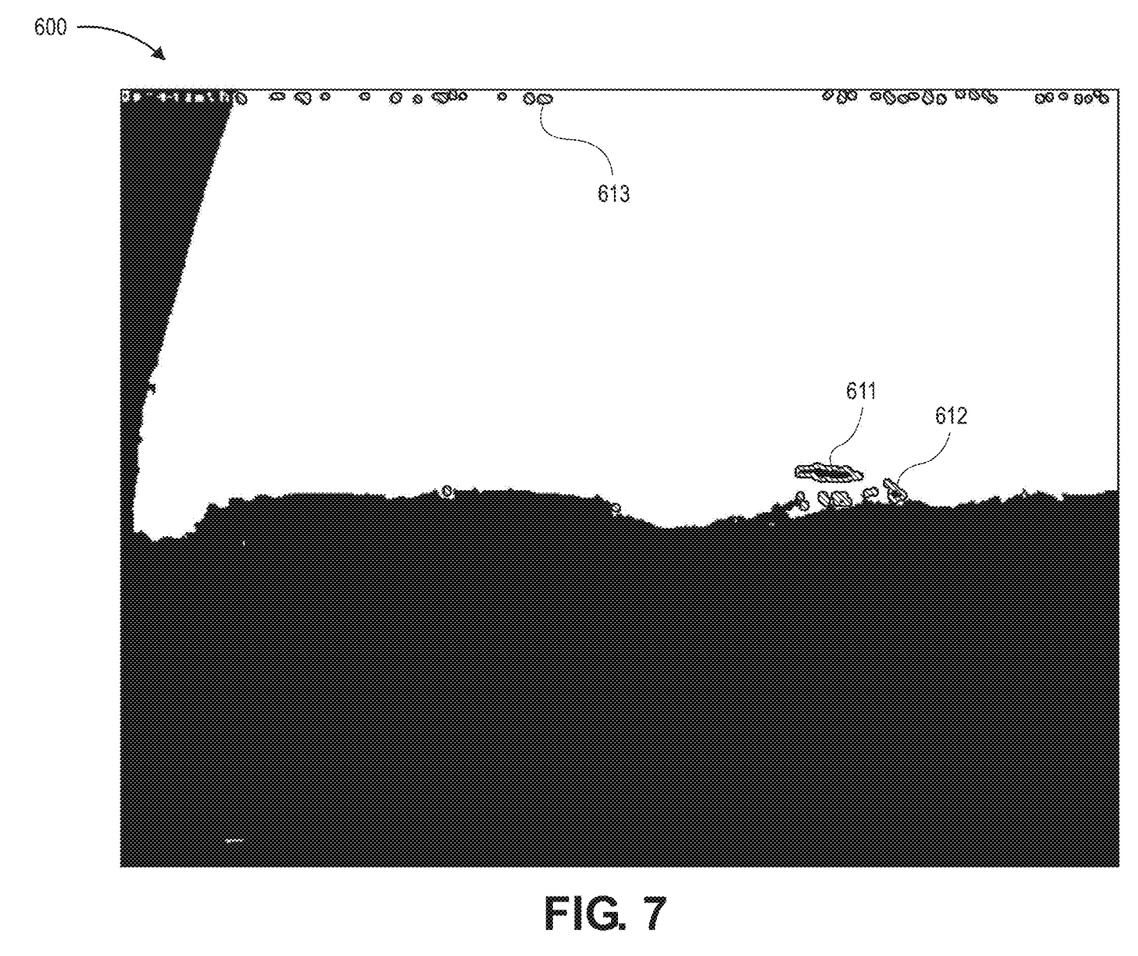
FIG. 7 illustrates the second image with a subset of first (e.g., black) pixels being converted into second (e.g., white) pixels, according to an example.

The method 200 may also include filtering the second image 600 to produce a third (e.g., filtered) image 900, as at 214. This step may be performed by the computing system 120. This step may include converting one or more subsets (three are labelled: 611-613) of the first (e.g., black) pixels 610 in the second image 600 into the second (e.g., white) pixels 620. This is shown in FIG. 7. A border is hatched around the subsets 611-613 to make them more easily identifiable. The subsets 611-613 represent the first (e.g., black) pixels 610 that are at least partially (or fully) surrounded by the second (e.g., white) pixels 620. As will be appreciated, no portion of the ground region 310 should be in or surrounded by the sky region 320, so this step is converting those portions of the ground region 310 into the sky region 320 so that there is one contiguous sky region 320.

Figure 8:
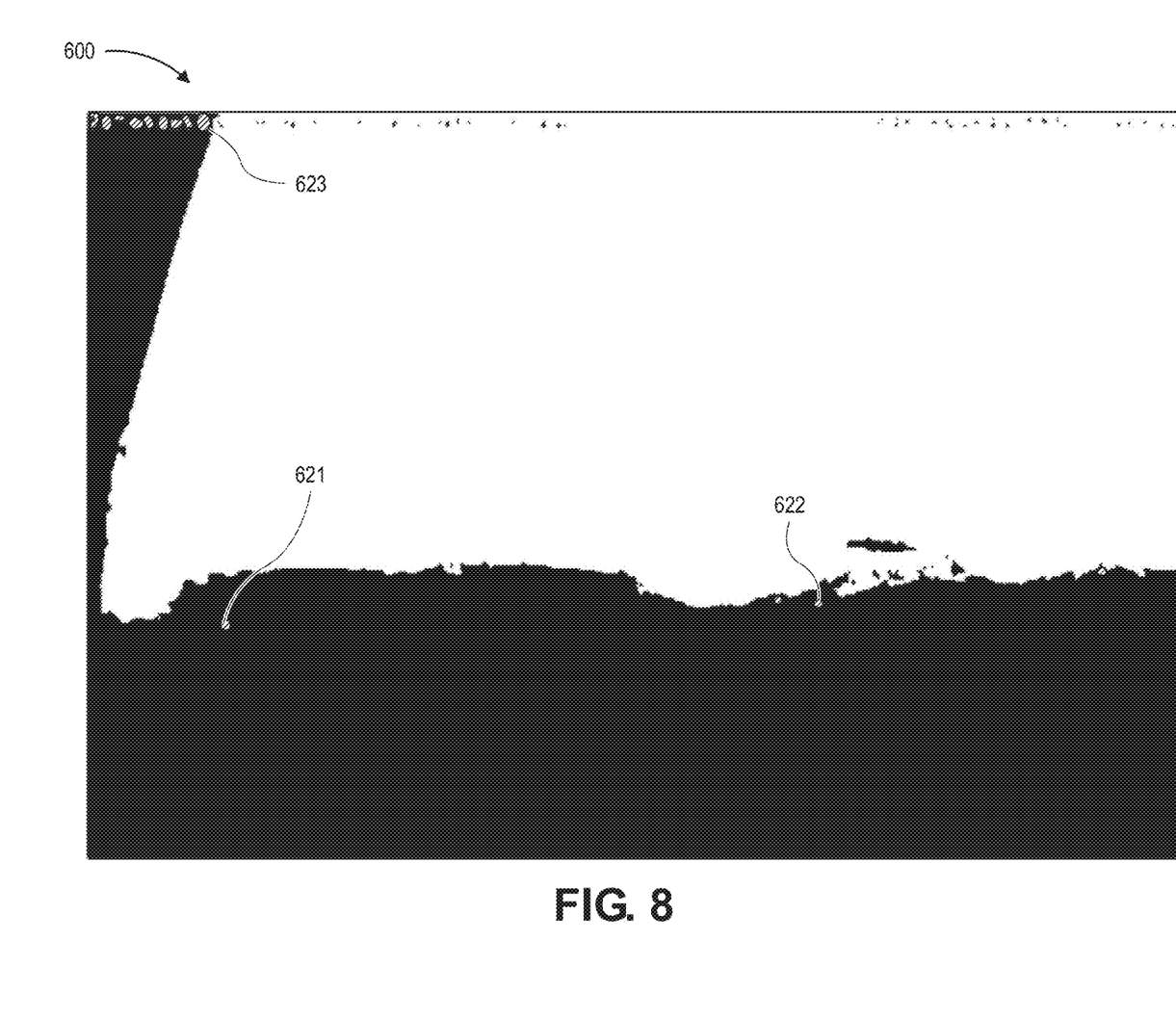
FIG. 8 illustrates the second image with a subset of the second (e.g., white) pixels being converted into the first (e.g., black) pixels, according to an example.
Figure 9:
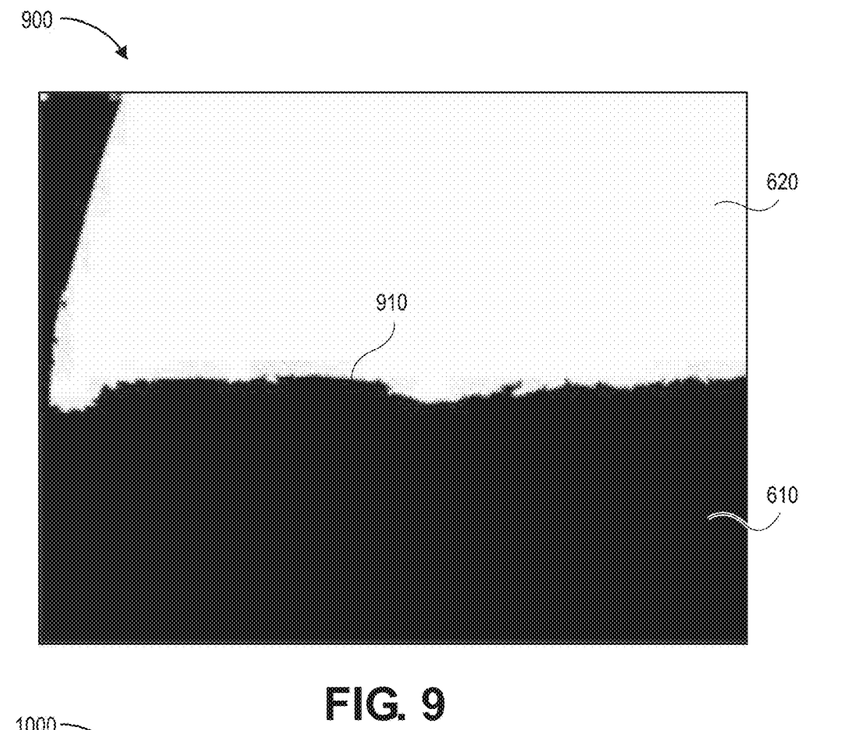
FIG. 9 illustrates a third (e.g., filtered) image that represents the second image after the pixels have been converted, according to an example.

This step may also include converting one or more subsets (three are labelled: 621-623) of the second (e.g., white) pixels 620 in the second image 600 into the first (e.g., black) pixels 610. This is shown in FIG. 8. A border is hatched around the subsets 621-623 to make them more easily identifiable. The subsets 621-623 represent the second (e.g., white) pixels 620 that are at least partially (or fully) surrounded by the first (e.g., black) pixels 610. As will be appreciated, no portion of the sky region 320 should be in or surrounded by the ground region 310, so this step is converting those portions of the sky region 320 into the ground region 310 so that there is one contiguous ground region 310. As mentioned above, filtering the second image 600 may produce the third (e.g., filtered) image 900, which is shown in FIG. 9.

The method 200 may also include identifying a horizon 910 between the first pixels 610 and the second pixels 620 in the third image 900, as at 216. This step may be performed by the computing system 120. The horizon 910 may be a substantially horizontal line; however, the horizon 910 may have vertical variations corresponding to mountains, valleys, buildings, trees, etc.

Figure 10:
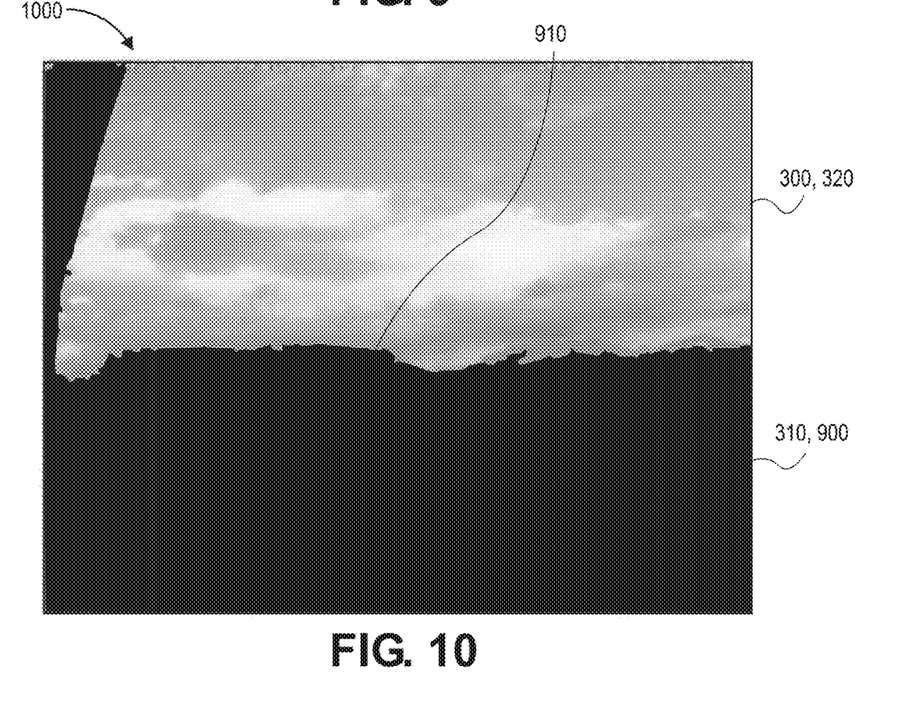
FIG. 10 illustrates a fourth (e.g., combined) image that represents at least a portion of the third image overlaid upon the first image, according to an example.

In an implementation, the method 200 may also include combining the first image 300 and at least a portion of the third image 900 to produce a fourth (e.g., combined) image 1000, as at 218. This is shown in FIG. 10. This step may be performed by the computing system 120. This may include overlaying at least a portion of the third image 900 on the first image 300 to produce the fourth image 1000. The portion of the third image 900 that is overlaid substantially corresponds to the ground region 310 in the first image 300. The fourth image 1000 may include the horizon 910. As shown, the portion of the third image 900 may be transparent or opaque such that the first image 300 underneath may be seen. In FIG. 10, the portion of the third image 900 is hatched to be seen more clearly. In another example, the portion of the third image 900 may be solid such that the first image 300 underneath may not be seen. In yet another example, this step may be omitted.

The method 200 may also include navigating (e.g., steering) the aircraft 100, as at 220. The aircraft 100 may be navigated (e.g., steered) based at least partially upon the third image 900, the horizon 910, the fourth image 1000, or a combination thereof. For example, the aircraft's pitch and/or roll may be determined based at least partially upon the horizon 910, and the aircraft 100 may be steered to adjust the pitch and/or roll. The navigation may be performed (e.g., automatically) by the computing system 120. In another example, the navigation may be performed by a user. The user may be in the aircraft 100 (e.g., a pilot), or the user may be on the ground and steering the aircraft 100 remotely.

In another example, the method 200 may also or instead include detecting one or more objects, as at 222. The objects may be detected based at least partially upon the third image 900, the horizon 910, the fourth image 1000, or a combination thereof. For example, the third image 900, the horizon 910, and/or the fourth image 1000 may be used as an input into a path-planning or object detection algorithm. The objects detected may be or include moving objects. For example, the objects may be or include other aircrafts in flight, and the aircraft 100 may be navigated in response to (e.g., to avoid) the other aircrafts in flight. The objects may be tracked by this method 200 continuously.

As used herein, the terms "inner" and "outer"; "up" and "down"; "upper" and "lower"; "upward" and "downward"; "upstream" and "downstream"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members." Similarly, the terms "bonded" and "bonding" refer to "directly bonded to" or "bonded to via one or more intermediate elements, members, or layers."

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more examples, alterations and/or modifications can be made to the illustrated examples without departing from the spirit and scope of the appended claims. In addition, while a particular feature of the present teachings may have been disclosed with respect to only one of several examples, such feature may be combined with one or more other features of the other examples as may be desired and advantageous for any given or particular function. As used herein, the terms "a", "an", and "the" may refer to one or more elements or parts of elements. As used herein, the terms "first" and "second" may refer to two different elements or parts of elements. As used herein, the term "at least one of A and B" with respect to a listing of items such as, for example, A and B, means A alone, B alone, or A and B. Those skilled in the art will recognize that these and other variations are possible. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

Clause 1: A method, comprising identifying a first image; determining a distribution based at least partially upon an intensity of each pixel in the first image; determining that the distribution is bimodal; dividing the first image to produce a second image in response to determining that the distribution is bimodal, wherein the second image comprises a plurality of first pixels and a plurality of second pixels; and determining that a horizon is defined between the plurality of first pixels and the plurality of second pixels.

Clause 2: The method of Clause 1, wherein the first image is captured by a camera on an aircraft in flight, and wherein the camera faces forward and covers a direction of flight.

Clause 3: The method of Clause 1 or 2, further comprising identifying a number of edges in the first image, wherein the distribution is determined in response to determining that the number of edges is greater than a predetermined threshold.

Clause 4: The method of Clause 3, wherein the distribution comprises a histogram.

Clause 5: The method of any of Clauses 1-4, wherein determining that the distribution is bimodal comprises determining an error between the distribution and a bimodal mixture of Gaussian distributions that corresponds to the distribution.

Clause 6: The method of any of Clauses 1-5, wherein the first image is divided using adaptive binary intensity thresholding.

Clause 7: The method of any of Clauses 1-6, wherein the first pixels correspond to a ground region, and the second pixels correspond to a sky region.

Clause 8: The method of any of Clauses 1-7, further comprising filtering the second image to produce a third image, wherein filtering the second image comprises converting a subset of the first pixels into the second pixels, and wherein the horizon is determined in the third image.

Clause 9: The method of Clause 8, wherein the subset of the first pixels is surrounded by the second pixels.

Clause 10: The method of any of Clauses 1-9, further comprising navigating an aircraft based at least partially upon the horizon.

Clause 11: A computing system comprising one or more processors; and a memory system comprising one or more non-transitory computer-readable media storing instructions that, when executed by at least one of the one or more processors, cause the computing system to perform operations, the operations comprising identifying a first image; identifying a number of edges in the first image; determining a distribution based at least partially upon an intensity of each pixel in the first image when the number of edges is greater than a predetermined threshold; determining that the distribution approximates a bimodal mixture of Gaussian distributions; in response to determining that the distribution approximates the bimodal mixture of Gaussian distributions, dividing the first image to produce a second image, wherein the second image comprises a plurality of first pixels corresponding to a ground region and a plurality of second pixels corresponding to a sky region; and determining that a horizon is defined between the first pixels and the second pixels.

Clause 12: The computing system of Clause 11, wherein the first image is captured by a camera on an aircraft in flight, and wherein the camera faces forward and covers a direction of flight.

Clause 13: The computing system of Clause 11 or 12, wherein determining that the distribution approximates the bimodal mixture of Gaussian distributions comprises: determining a first error between the distribution and a unimodal Gaussian distribution that corresponds to the distribution; and determining a second error between the distribution and the bimodal mixture of Gaussian distributions that corresponds to the distribution, wherein the determination that the distribution approximates the bimodal mixture of Gaussian distributions is based at least partially upon the first and second errors.

Clause 14: The computing system of any of Clauses 11-13, further comprising filtering the second image to produce a third image, wherein filtering the second image comprises: converting a subset of the first pixels into the second pixels, wherein the subset of the first pixels is surrounded by the second pixels; and converting a subset of the second pixels into the first pixels, wherein the subset of the second pixels is surrounded by the first pixels, wherein the horizon is determined in the third image.

Clause 15: The computing system of any of Clauses 11-14, wherein the operations further comprise navigating an aircraft based at least partially upon the horizon.

Clause 16: A computing system comprising: one or more processors; and a memory system comprising one or more non-transitory computer-readable media storing instructions that, when executed by at least one of the one or more processors, cause the computing system to perform operations, the operations comprising: identifying a first image, wherein the image is captured by a camera on an aircraft in flight; identifying a number of edges in the first image; determining a histogram based at least partially upon an intensity of each pixel in the first image when the number of edges is greater than a predetermined threshold; determining that the histogram more closely approximates a bimodal mixture of Gaussian distributions than a unimodal Gaussian distribution, wherein determining that the histogram more closely approximates the bimodal mixture of Gaussian distributions comprises determining a first error between the histogram and the bimodal mixture of Gaussian distributions that corresponds to the histogram, wherein the determination that the histogram more closely approximates the bimodal mixture of Gaussian distributions is based at least partially upon the first error; in response to determining that the histogram more closely approximates the bimodal mixture of Gaussian distributions, dividing the first image to produce a second image, wherein the second image comprises a plurality first pixels corresponding to a ground region and a plurality of second pixels corresponding to a sky region, wherein the first pixels have a first color, and wherein the second pixels have a second, different color; filtering the second image to produce a third image; determining that a horizon is defined between the first pixels and the second pixels in the third image; and combining the first image and at least a portion of the third image to produce a fourth image, wherein the fourth image also comprises the horizon.

Clause 17: The computing system of Clause 16, wherein determining that the histogram more closely approximates the bimodal mixture of Gaussian distributions further comprises determining a second error between the histogram and the unimodal Gaussian distribution that corresponds to the histogram, wherein the determination that the histogram more closely approximates the bimodal mixture of Gaussian distributions is based at least partially upon the first error and the second error.

Clause 18: The computing system of Clause 17, wherein filtering the second image comprises converting a subset of the first pixels into the second pixels, and wherein the subset of the first pixels is surrounded by the second pixels.

Clause 19: The computing system of Clause 18, wherein filtering the second image further comprises converting a subset of the second pixels into the first pixels, and wherein the subset of the second pixels is surrounded by the first pixels.

Clause 20: The computing system of Clause 19, further comprising: detecting an object in the third image or the fourth image; and causing the aircraft to navigate based at least partially upon a trajectory of the object.

What is claimed is:

1. A method, comprising:
   identifying a first image;
   determining a distribution based at least partially upon an intensity of each pixel in the first image;
   determining that the distribution is bimodal;
   dividing the first image to produce a second image in response to determining that the distribution is bimodal, wherein the second image comprises a plurality of first pixels and a plurality of second pixels, and wherein the first pixels correspond to a ground region, and the second pixels correspond to a sky region; and
   determining that a horizon is defined between the plurality of first pixels and the plurality of second pixels.

2. The method of claim 1, wherein the first image is captured by a camera on an aircraft in flight, and wherein the camera faces forward and covers a direction of flight.

3. The method of claim 1, further comprising identifying a number of edges in the first image, wherein the distribution is determined in response to determining that the number of edges is greater than a predetermined threshold.

4. The method of claim 3, wherein the distribution comprises a histogram.

5. The method of claim 1, wherein determining that the distribution is bimodal comprises determining an error between the distribution and a bimodal mixture of Gaussian distributions that corresponds to the distribution.

6. The method of claim 1, wherein the first image is divided using adaptive binary intensity thresholding.

7. The method of claim 1, further comprising filtering the second image to produce a third image, wherein filtering the second image comprises converting a subset of the first pixels into the second pixels, and wherein the horizon is determined in the third image.

8. The method of claim 7, wherein the subset of the first pixels is surrounded by the second pixels.

9. The method of claim 1, further comprising navigating an aircraft based at least partially upon the horizon.

10. A computing system comprising:
one or more processors; and
a memory system comprising one or more non-transitory computer-readable media storing instructions that, when executed by at least one of the one or more processors, cause the computing system to perform operations, the operations comprising:
identifying a first image;
identifying a number of edges in the first image;
determining a distribution based at least partially upon an intensity of each pixel in the first image when the number of edges is greater than a predetermined threshold;
determining that the distribution approximates a bimodal mixture of Gaussian distributions;
in response to determining that the distribution approximates the bimodal mixture of Gaussian distributions, dividing the first image to produce a second image, wherein the second image comprises a plurality of first pixels and a plurality of second pixels; and
determining that a horizon is defined between the first pixels and the second pixels.

11. The computing system of claim 10, wherein the first image is captured by a camera on an aircraft in flight, and wherein the camera faces forward and covers a direction of flight.

12. The computing system of claim 10, wherein determining that the distribution approximates the bimodal mixture of Gaussian distributions comprises:
determining a first error between the distribution and a unimodal Gaussian distribution that corresponds to the distribution; and
determining a second error between the distribution and the bimodal mixture of Gaussian distributions that corresponds to the distribution, wherein the determination that the distribution approximates the bimodal mixture of Gaussian distributions is based at least partially upon the first and second errors.

13. The computing system of claim 10, further comprising filtering the second image to produce a third image, wherein filtering the second image comprises:
converting a subset of the first pixels into the second pixels, wherein the subset of the first pixels is surrounded by the second pixels; and
converting a subset of the second pixels into the first pixels, wherein the subset of the second pixels is surrounded by the first pixels,
wherein the horizon is determined in the third image.

14. The computing system of claim 10, wherein the operations further comprise navigating an aircraft based at least partially upon the horizon.

15. A computing system comprising:
one or more processors; and
a memory system comprising one or more non-transitory computer-readable media storing instructions that, when executed by at least one of the one or more processors, cause the computing system to perform operations, the operations comprising:
identifying a first image;
determining a histogram based at least partially upon an intensity of each pixel in the first image;
determining that the histogram more closely approximates a bimodal mixture of Gaussian distributions than a unimodal Gaussian distribution, wherein determining that the histogram more closely approximates the bimodal mixture of Gaussian distributions comprises determining a first error between the histogram and the bimodal mixture of Gaussian distributions that corresponds to the histogram, wherein the determination that the histogram more closely approximates the bimodal mixture of Gaussian distributions is based at least partially upon the first error;
in response to determining that the histogram more closely approximates the bimodal mixture of Gaussian distributions, dividing the first image to produce a second image, wherein the second image comprises a plurality of first pixels and a plurality of second pixels, and
determining that a horizon is defined between the first pixels and the second pixels.

16. The computing system of claim 15, wherein determining that the histogram more closely approximates the bimodal mixture of Gaussian distributions further comprises determining a second error between the histogram and the unimodal Gaussian distribution that corresponds to the histogram, wherein the determination that the histogram more closely approximates the bimodal mixture of Gaussian distributions is based at least partially upon the first error and the second error.

17. The computing system of claim 16, wherein the operations further comprise filtering the second image to produce a third image, wherein filtering the second image comprises converting a subset of the first pixels into the second pixels, and wherein the subset of the first pixels is surrounded by the second pixels.

18. The computing system of claim 17, wherein filtering the second image further comprises converting a subset of the second pixels into the first pixels, and wherein the subset of the second pixels is surrounded by the first pixels.

19. The computing system of claim 18, wherein the operations further comprise:
combining the first image and at least a portion of the third image to produce a fourth image, wherein the fourth image also comprises the horizon,
detecting an object in the third image or the fourth image; and
causing an aircraft to navigate based at least partially upon a trajectory of the object.

20. The computing system of claim 15, wherein the first image is divided using adaptive binary intensity thresholding.

* * * * *